(12) United States Patent
Poss et al.

(10) Patent No.: US 11,694,712 B2
(45) Date of Patent: *Jul. 4, 2023

(54) DATA STORAGE DEVICE PRE-BIASING WRITE CURRENT FOR ENERGY ASSISTED MAGNETIC RECORDING

(71) Applicant: Western Digital Technologies, Inc., San Jose, CA (US)

(72) Inventors: Joey M. Poss, Rochester, MN (US); Naoto Ito, Kanagawa (JP); Phillip S. Haralson, Huntington Beach, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/241,990

(22) Filed: Apr. 27, 2021

(65) Prior Publication Data

US 2022/0343943 A1 Oct. 27, 2022

(51) Int. Cl.
| | | |
|---|---|---|
| *G11B 5/02* | (2006.01) | |
| *G11B 5/012* | (2006.01) | |
| G11B 5/027 | (2006.01) | |
| G11B 5/00 | (2006.01) | |
| G11B 5/54 | (2006.01) | |

(52) U.S. Cl.
CPC ............... *G11B 5/02* (2013.01); *G11B 5/012* (2013.01); *G11B 5/027* (2013.01); *G11B 5/54* (2013.01); *G11B 2005/001* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 7,515,371 B1 | 4/2009 | Buch et al. | |
| 8,537,487 B2 | 9/2013 | Goldberg et al. | |
| 8,724,244 B1 | 5/2014 | Poss et al. | |
| 8,737,006 B2 | 5/2014 | Livshitz et al. | |
| 9,019,646 B2 | 4/2015 | Rausch et al. | |
| 9,070,397 B1 | 6/2015 | Ito et al. | |
| 9,105,279 B2 * | 8/2015 | Shiroishi | G11B 5/02 |
| 9,620,162 B1 | 4/2017 | Haralson | |
| 9,779,770 B1 * | 10/2017 | Nolan | G11B 5/64 |
| 9,805,741 B1 * | 10/2017 | Ma | G11B 20/105 |
| 9,916,851 B1 | 3/2018 | Seigler et al. | |
| 10,079,033 B1 * | 9/2018 | Oberg | G11B 5/4806 |
| 10,381,036 B1 * | 8/2019 | Lammers | H01S 5/06808 |
| 11,004,468 B2 * | 5/2021 | Maeto | G11B 27/10 |
| 11,200,912 B1 * | 12/2021 | Guo | G11B 5/09 |
| 11,404,079 B1 * | 8/2022 | Poss | G11B 5/6011 |

(Continued)

*Primary Examiner* — Craig A. Renner
(74) *Attorney, Agent, or Firm* — Patterson + Sheridan, LLP; Steven H. VerSteeg

(57) ABSTRACT

A data storage device is disclosed comprising a head actuated over an energy assisted magnetic media comprising a plurality of data tracks, wherein each data track comprises a plurality of data sectors. A write operation to a first data sector is executed by applying a first current to a write coil of the head while the head is over a second data sector preceding the first data sector, wherein the first current comprises a first amplitude. A second current is applied to the write coil while the head is over the first data sector, wherein the second current comprises a second amplitude lower than the first amplitude.

14 Claims, 6 Drawing Sheets

(56) References Cited

U.S. PATENT DOCUMENTS

| | | | |
|---|---|---|---|
| 2005/0243457 A1 | 11/2005 | Akamatsu et al. | |
| 2015/0235665 A1* | 8/2015 | Chu | G11B 5/09 |
| | | | 369/13.26 |
| 2021/0065736 A1* | 3/2021 | Tomoda | G11B 5/59605 |
| 2021/0090605 A1* | 3/2021 | Suzuki | G11B 5/187 |
| 2021/0201940 A1* | 7/2021 | Isokawa | G11B 5/02 |
| 2022/0246173 A1* | 8/2022 | Guo | G11B 5/59666 |

* cited by examiner

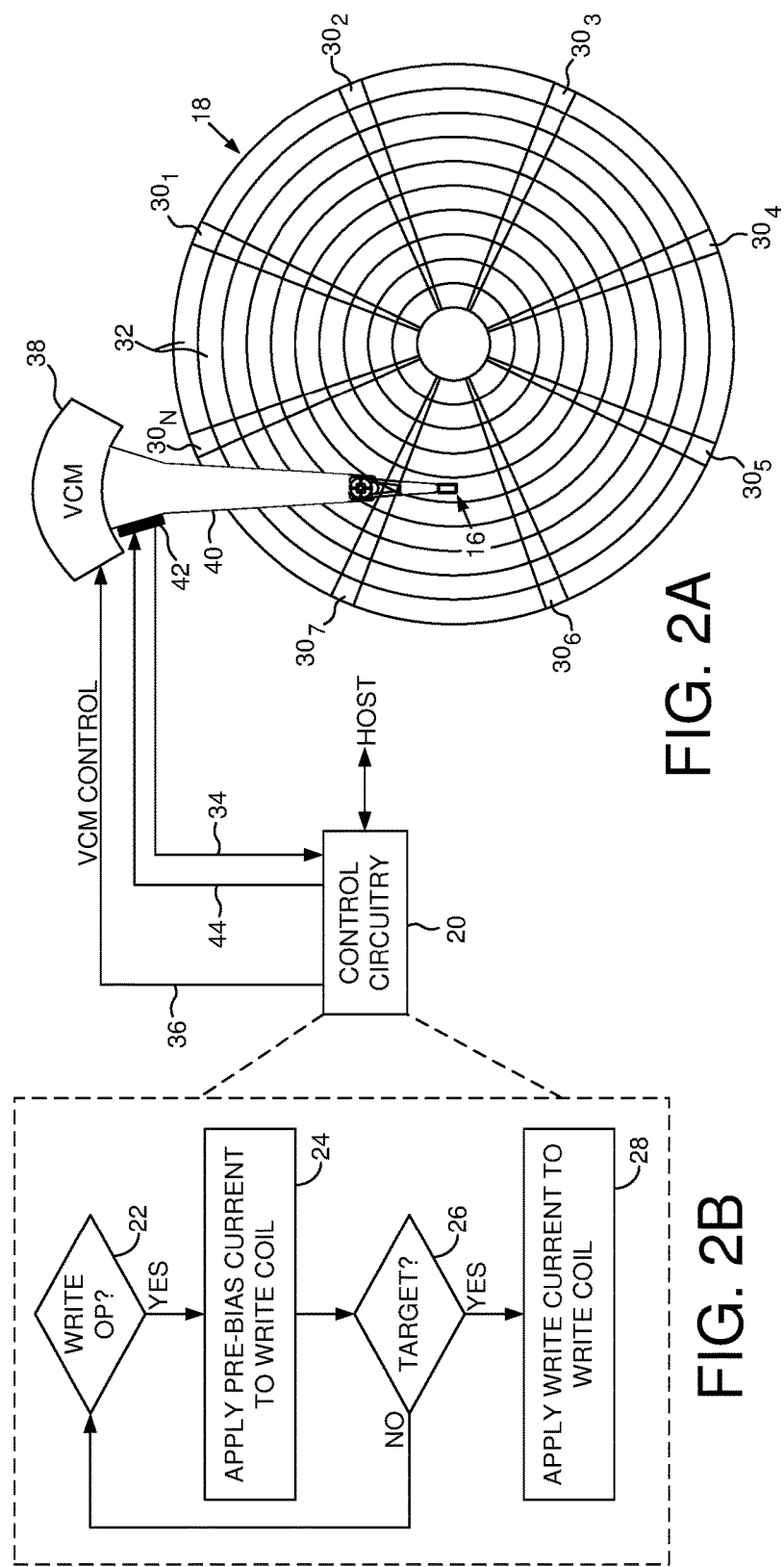
FIG. 2A
FIG. 2B
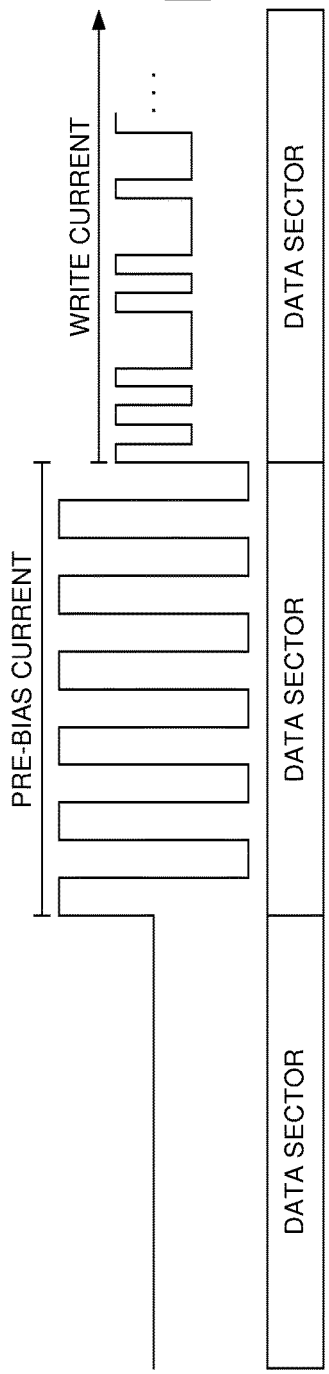
FIG. 2C

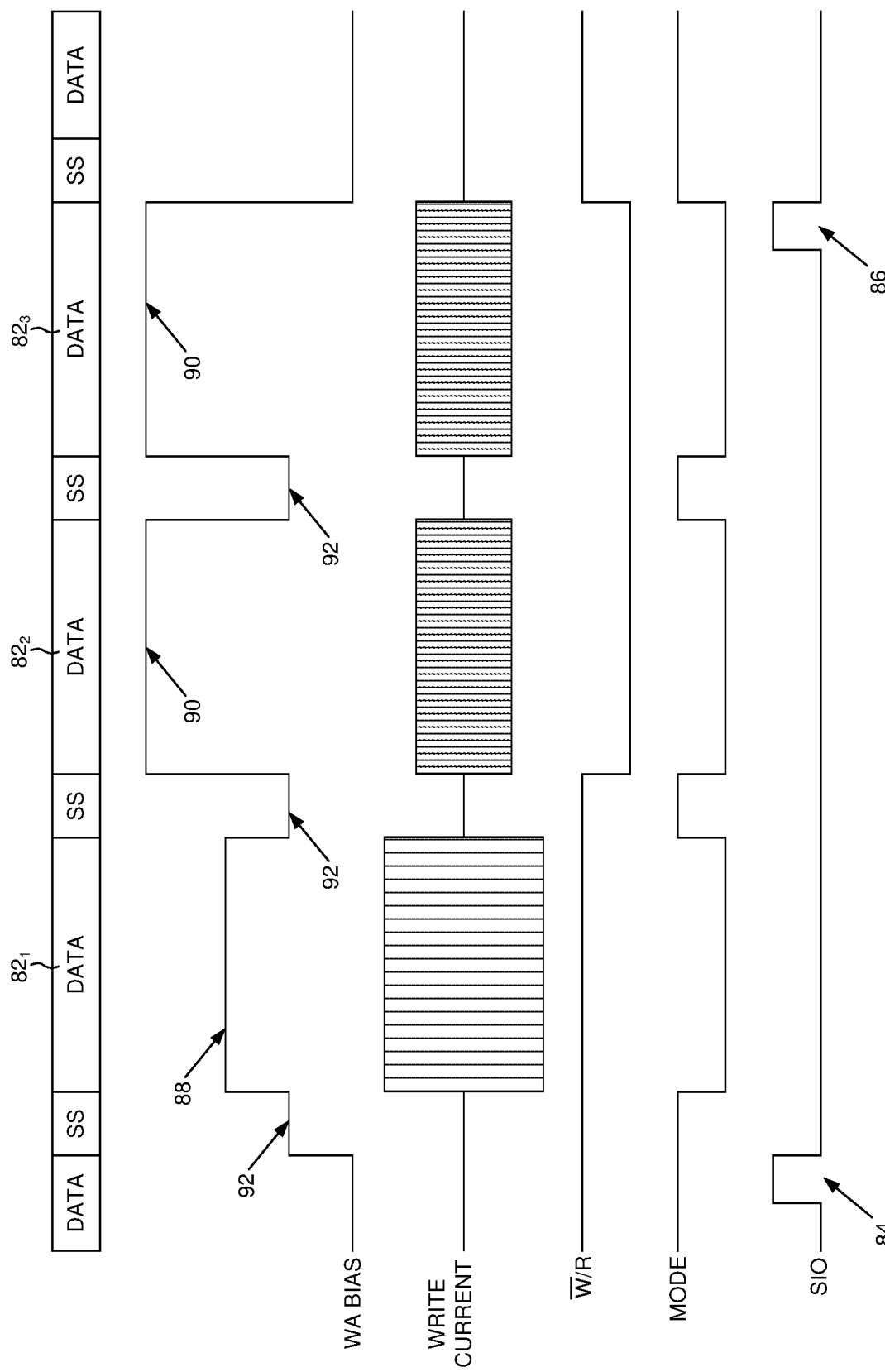

DATA STORAGE DEVICE PRE-BIASING WRITE CURRENT FOR ENERGY ASSISTED MAGNETIC RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_1$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_1$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

BRIEF DESCRIPTION OF THE DRAWINGS

FIG. 2A shows a data storage device in the form of a disk drive according to an embodiment comprising a head actuated over a disk, wherein the head comprises a write coil.

FIG. 2B is a flow diagram according to an embodiment wherein the write coil is pre-biased during a write operation with a current having an amplitude higher than an amplitude when writing to the disk.

FIG. 2C shows an embodiment wherein the pre-bias current amplitude is higher than when writing to the disk, and the maximum pre-bias current transition frequency is lower than the maximum write current transition frequency when writing to the disk.

FIG. 7 shows an embodiment wherein a write coil and a write assist element are pre-biased by gating the mode line during a pre-bias interval of a write operation.

DETAILED DESCRIPTION

Figure 1:
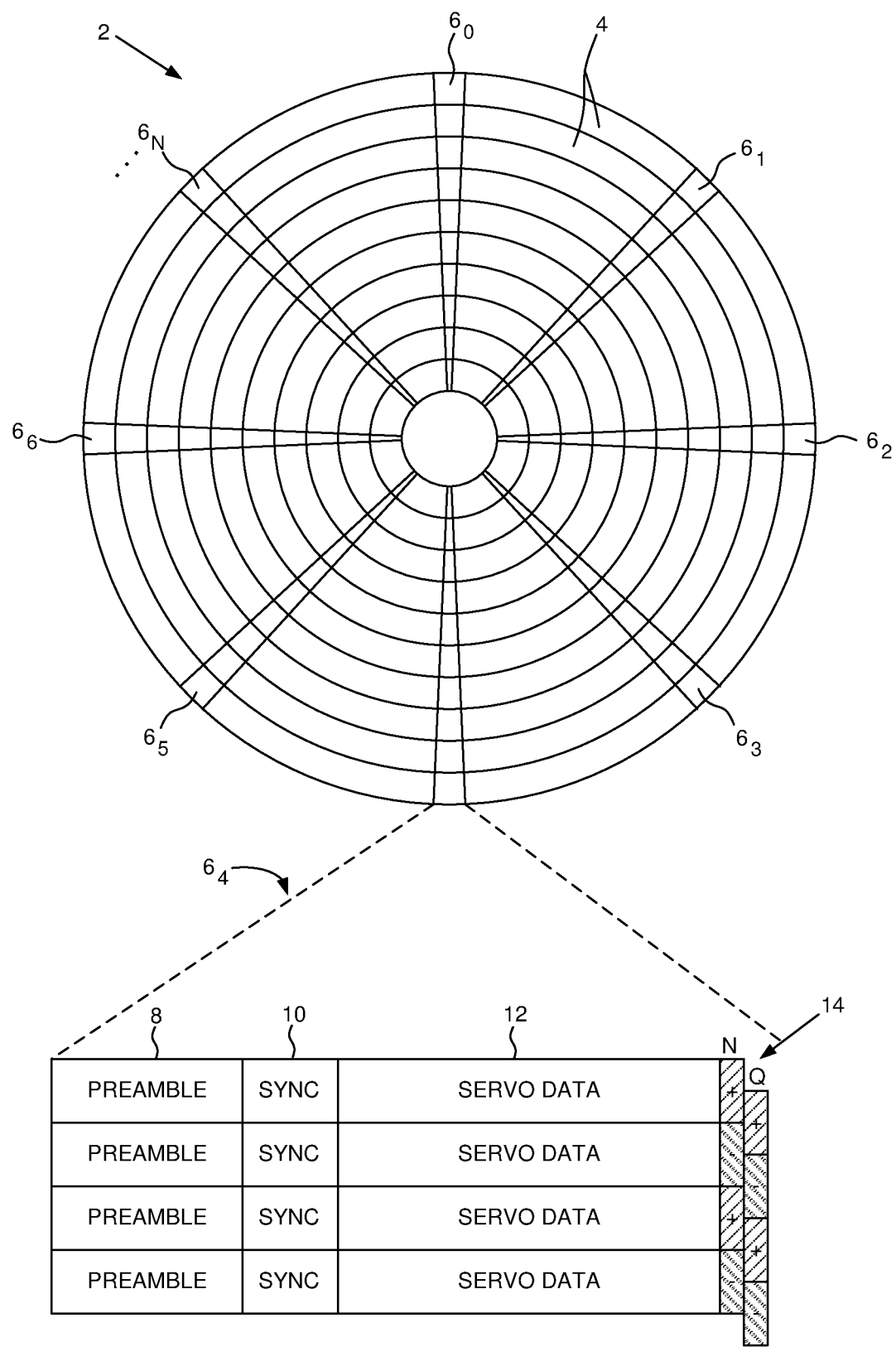
FIG. 1 shows a prior art disk format comprising a plurality of servo tracks defined by servo sectors.

FIG. 2A shows a data storage device in the form of a disk drive according to an embodiment comprising a head 16 actuated over an energy assisted magnetic media in the form of a disk 18, wherein the head 16 comprises a write coil. While a disk drive is used as an illustrative example herein, various embodiments of the invention may be applied to, and/or include, other types of data storage device with energy assisted magnetic media such as tape drives. The disk drive further comprises control circuitry 20 configured to execute the flow diagram of FIG. 2B during a write operation to a first data sector (block 22). A first current is applied to the write coil while the head is over a second data sector preceding the first data sector (FIG. 2C), wherein the first current comprises a first amplitude (block 24). When the head reaches the first data sector (block 26), a second current is applied to the write coil while the head is over the first data sector (FIG. 2C), wherein the second current comprises a second amplitude lower than the first amplitude (block 28). In one embodiment, the energy assisted magnetic media may be of a high coercivity such that the orientation of the magnetic grains is switched when an energy assist element of the head is providing an assistive effect to the magnetic field from a write pole/coil.

In the embodiment of FIG. 2A, the disk 18 comprises a plurality of servo sectors $30_1$-$30_N$ that define a plurality of servo tracks 32, wherein data tracks are defined relative to the servo tracks at the same or different radial density. The control circuitry 20 processes a read signal 34 emanating from the head to demodulate the servo sectors and generate a position error signal (PES) representing an error between the actual position of the head and a target position relative to a target track. A servo control system in the control circuitry 20 filters the PES using a suitable compensation filter to generate a control signal 36 applied to a coarse actuator 38 (e.g., VCM) which rotates an actuator arm 40 about a pivot in order to actuate the head radially over the disk in a direction that reduces the PES. The head may also be served using a fine actuator, such as a piezoelectric (PZT) actuator, configured to actuate a suspension relative to the actuator arm 40, and/or configured to actuate the head relative to the suspension. The servo sectors $30_1$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2A, a preamp circuit 42 comprises write/read circuitry configured to receive a write signal 44 from the control circuitry 20 during write operations, and in response generate the current applied to the write coil. During a read operation, the preamp circuit 42 is configured to pre-amplify the read signal generated by a read element of the head 16 and transmit the pre-amplified read signal 34 to the control circuitry 20.

In one embodiment, applying the write current to the write coil during a write operation causes a protrusion of the head toward the disk surface due to a heating effect of the write coil, thereby changing the fly height of the head and corresponding quality of the written data. Accordingly in one embodiment a pre-bias current is applied to the write coil during a pre-bias interval of a write operation so that the write protrusion and corresponding fly height reach a relatively stable steady state prior to writing data to the disk. In one embodiment, the preamp circuit 42 generates the pre-bias current to have a maximum transition frequency that is lower than the maximum transition frequency of the write current when writing data to the disk. For example, in one embodiment the preamp circuit 42 may generate the pre-bias current having a constant 2T transition frequency (where T represents a bit cell period of written data), whereas the write current may be generated having a maximum 1T transition frequency such as shown in the example of FIG. 2C. In one embodiment, applying a current having a lower transition frequency to the write coil induces a lower excitation energy and corresponding heating effect that causes the write protrusion. Accordingly since the pre-bias current is generated having a lower maximum transition frequency than the write current transition frequency, in one embodiment the amplitude of the pre-bias current is increased in order to achieve an excitation of the write coil that is substantially equivalent to the higher transition frequency of the write current when writing data to the disk.

Figure 3A:
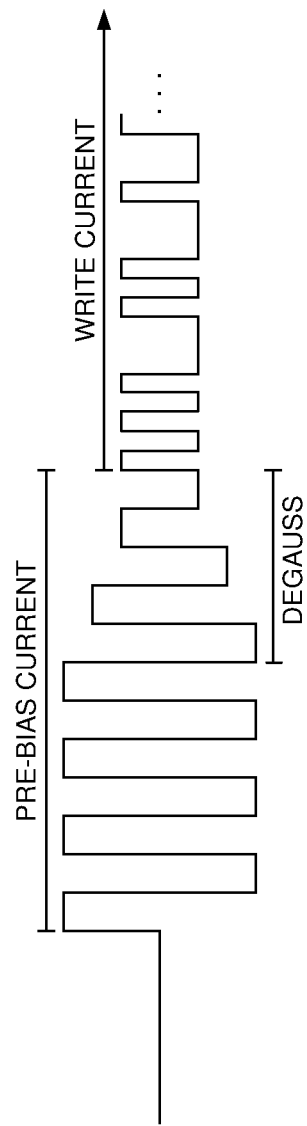
FIG. 3A shows an embodiment wherein during a write operation the write current is ramped down from the pre-bias amplitude to the write amplitude in order to degauss the write coil.
Figure 3B:
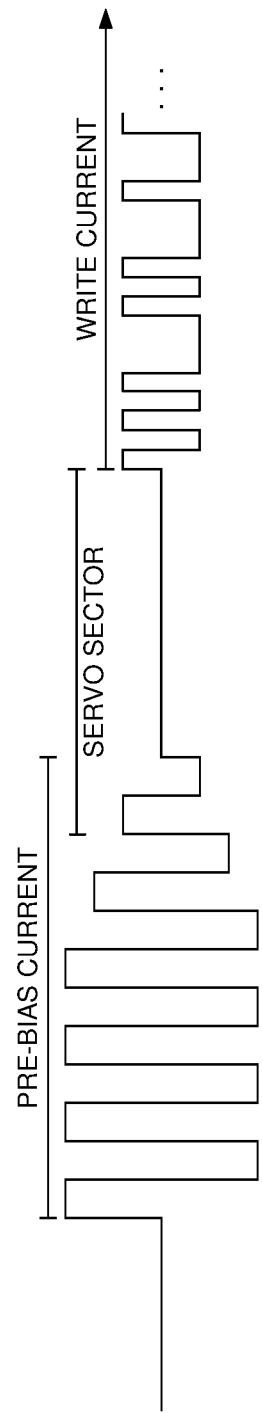
FIG. 3B shows an embodiment wherein the write current is ramped down from the pre-bias amplitude in order to degauss the write coil and avoid corrupting a servo sector.

FIG. 3A shows an embodiment wherein during a write operation the write current is ramped down from the pre-bias amplitude to the write amplitude in order to degauss the write coil before writing data to the disk. FIG. 3B shows an embodiment wherein the write current is ramped down from the pre-bias amplitude to a zero amplitude in order to degauss the write coil and avoid corrupting a servo sector.

Figure 4:
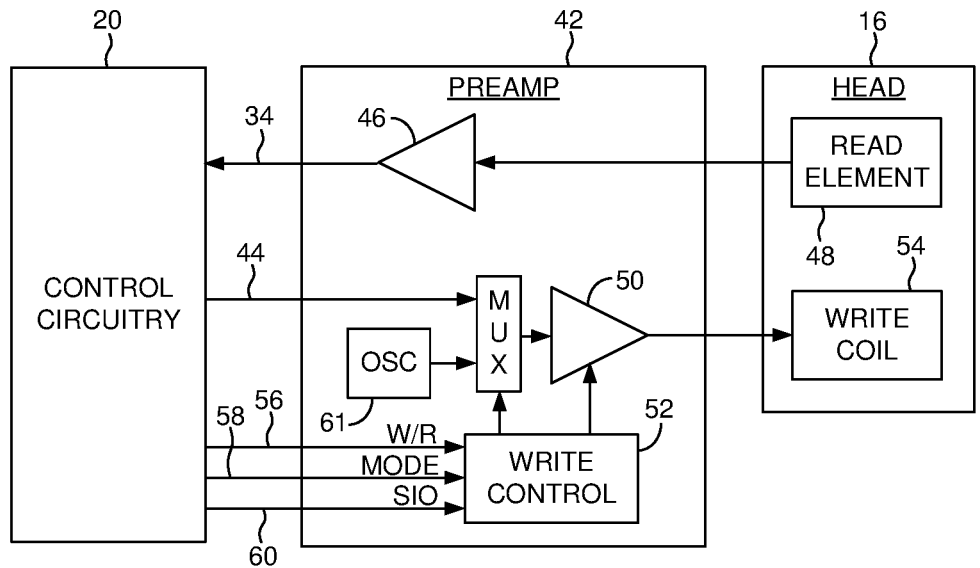
FIG. 4 shows an embodiment wherein a preamp circuit comprises an oscillator configured to generate the pre-bias current during a pre-bias interval of a write operation.

FIG. 4 shows a preamp circuit 42 according to an embodiment comprising a read amplifier 46 configured to pre-amplify a read signal generated by a read element 48 of the head 16 during a read operation, wherein the pre-amplified read signal 34 is transmitted to the control circuitry 20 for demodulation. During a write operation, the control circuitry 20 transmits a write signal 44 (e.g., a non-return to zero (NRZ) signal) to the preamp circuit 42 representing the data to be recorded on the disk. The preamp circuit 42 comprises a write amplifier 50 configured by write control logic 52 to generate a current applied to the write coil 54 in order to record magnetic transitions on the disk representing the recorded data. The preamp circuit 42 of FIG. 4 further comprises a write/read (W/R) line 56, a mode line 58, and a serial input/output (SIO) interface 60 for configuring the write control logic 52. During a pre-bias interval of a write operation, the write control logic 52 configures an oscillator 61 to generate an oscillating pre-bias current applied to the write coil 54 having a predetermined amplitude (e.g., by configuring the gain of the write amplifier 50) and transition frequency (e.g., by configuring the frequency of the oscillator 61) such as shown in FIG. 2C.

Figure 5:
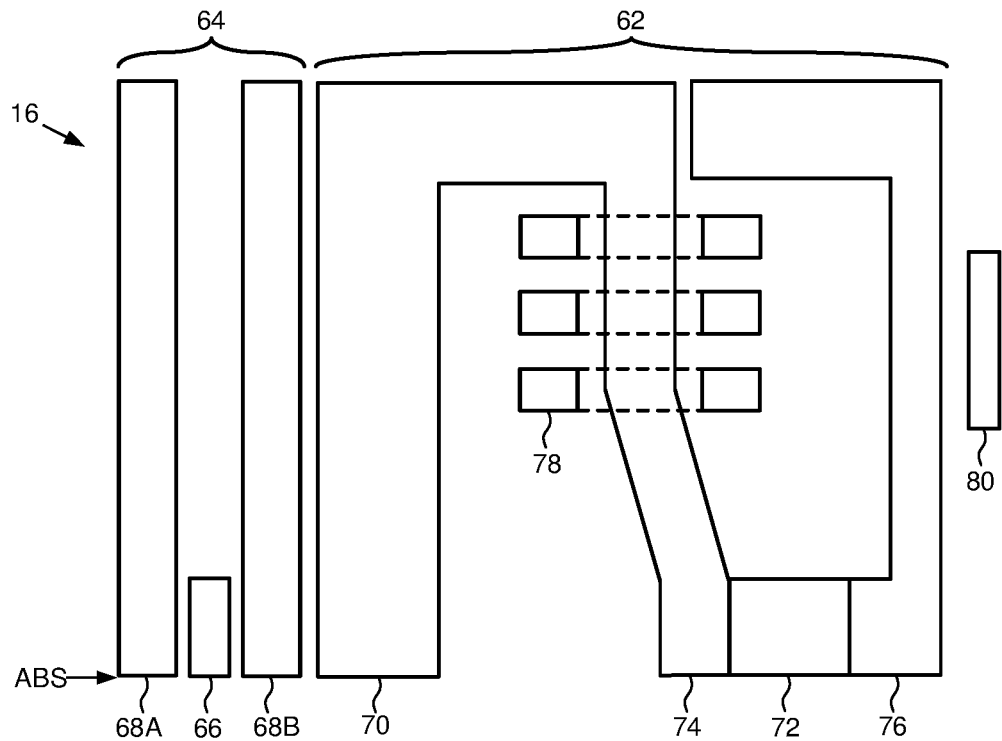
FIG. 5 shows a head according to an embodiment comprising a write coil and a write assist element.

FIG. 5 shows a cross-sectional view of an example head 16 according to an embodiment, wherein the head 16 may comprise more or fewer elements in various other embodiments. In the embodiment of FIG. 5, the head 16 comprises write elements 62 configured to write data to the disk surface, and read elements 64 configured to read data from the disk surface. The bottom surface of the head 16 facing the disk surface is referred to as an air bearing surface (ABS) wherein an air bearing forms between the head 16 and the disk surface due to the disk spinning such that the head 16 effectively flies above the disk surface. The read elements 64 of the head 16 may comprise a magnetoresistive (MR) read element 66 that is fabricated between MR shields 68A and 68B. Other embodiments may employ a different read element, such as a suitable magnetic tunneling junction (MTJ) read element. The write elements 62 comprise a return pole 70, a write assist element 72 (e.g., a suitable laser and NFT in HAMR, a STO in MAMR, or a material stack, including conductive materials, used in energy assisted recording) fabricated between a main pole 74 and a trailing shield 76, and a write coil 78 that excites the main pole 74 to generate a magnetic write field that magnetizes the disk surface, thereby writing data to the disk surface. It is noted that the location of the write assist element 72 may differ from the example shown, depending on the assisted recording technology implementations. The head 16 may also comprise a fly height actuator (FHA) 80 that is biased to achieve a target fly height of the head 16 over the disk surface. Any suitable FHA 80 may be employed, such as a suitable thermal actuator that adjusts the fly height through thermal expansion, or a suitable mechanical actuator such as a suitable piezoelectric actuator that adjusts the fly height through mechanical deflection.

Figure 6:
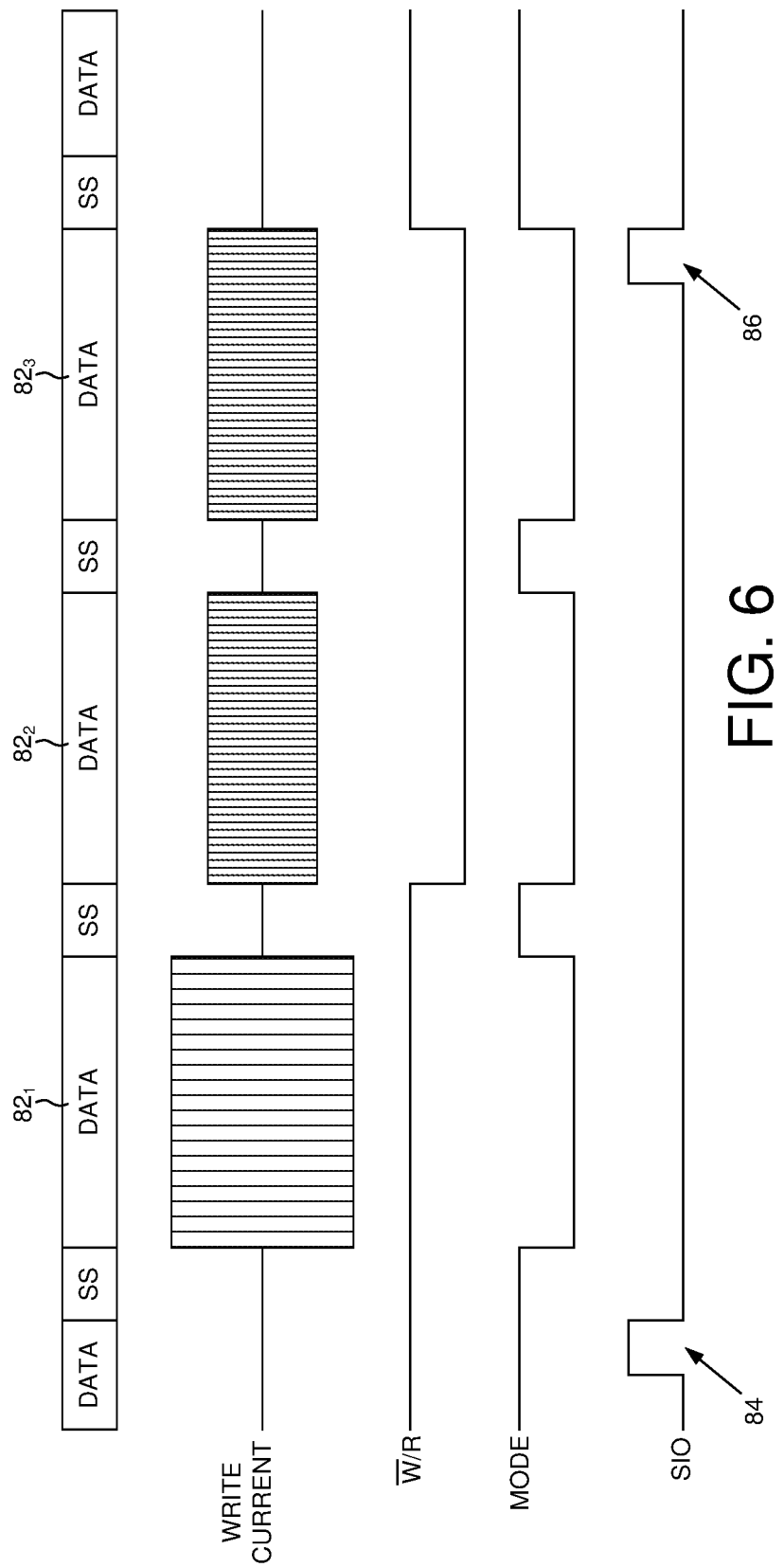
FIG. 6 shows an embodiment wherein a mode line of the preamp circuit is configured using a serial interface command in order to enable/disable the pre-bias operating mode.

In one embodiment, the mode line 58 of the preamp circuit 42 is configured based on an operating mode, wherein in one embodiment the mode line 58 is configured using a serial I/O command to enable the pre-bias current during the pre-bias interval of a write operation. FIG. 6 shows an example of this embodiment while executing a write command to data sectors $82_2$ and $82_3$. Prior to the head reaching the preceding data sector $82_1$, the control circuitry 20 transmits a serial I/O command 84 in order to configure the mode line 58 into a pre-bias operating mode. When the head reaches data sector $82_1$, the control circuitry 20 toggles the mode line 58 in order to enable the pre-bias current applied to the write coil as shown in FIG. 6. That is, in this example when the W/R line 56 is high and the mode line 58 is low, the write control logic 52 in the preamp circuit 42 enables the oscillator 61 to generate the pre-bias current applied to the write coil and configures the write amplifier 50 with a pre-bias gain which is higher than a gain when writing data to the disk. When the head is over a servo sector (SS) in FIG. 6, the control circuitry 20 toggles the mode line 58 to the high state in order to disable the write coil current while the head is over the servo sector, thereby preventing the write coil current from degrading the data recorded in the servo sector. In the example of FIG. 6, the pre-bias interval spans the entire data sector preceding the target data sectors; however, in other embodiments the pre-bias interval may span only part of the preceding data sector, and in yet another embodiment the pre-bias interval may span multiple data sectors preceding the target data sector(s). At the end of the write operation, the control circuitry 20 transmits a serial I/O command 86 in order to configure the mode line 58 into an operating mode different than a write operation. For example, the mode line 58 may be configured to enable a feature of the preamp circuit 42 during a read operation. In this manner, the mode line 58 may be overprovisioned to perform multiple functions depending on the operating mode of the preamp circuit 42 as compared to implementing a separate transmission line for each of multiple preamp functions.

In one embodiment, a pre-bias current may be applied to the write coil during a pre-bias interval without causing significant degradation to the data recorded in the corresponding data sector (e.g., data sector $82_1$ in FIG. 6) by configuring the pre-bias of a write assist element to a sufficiently low value. That is, with energy assisted magnetic recording, the magnetic media may be of a high coercivity such that it may be subject to a magnetic field due to a pre-bias current to the write coil without significantly affecting the orientation of the magnetic grains, when the energy assist element of the head is inactive, or otherwise providing a sufficiently low assistive effect. FIG. 7 shows an example of this embodiment wherein during the pre-bias interval while the head is over data sector $82_1$, a pre-bias of a write assist element 72 is configured to an energy level 88 which is sufficiently low to prevent the pre-bias current applied to the write coil from significantly damaging the data previously recorded in data sector $82_1$. When writing to the target data sectors $82_2$ and $82_3$ the write assist element 72 is configured to an energy level 90 which enables the recording of magnetic transitions by the write current applied to the write coil. When the head is over a servo sector (SS), zero current is applied to the write coil and an energy assist level 92 is applied to the write assist element 72 in order to maintain the write protrusion of the head near a target value without corrupting the data recorded in the servo sectors. In this embodiment, the mode line 58 of the preamp circuit 42 is processed by the write control logic 52 to configure the current applied to the write coil and the bias applied to the write assist element as shown in FIG. 7.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   an energy assisted magnetic media comprising a plurality of data tracks, wherein each data track comprises a plurality of data sectors;
   a head actuated over the energy assisted magnetic media, wherein the head comprises a write coil; and
   control circuitry configured to execute a write operation to a first data sector by at least:

applying a first current to the write coil while the head is over a second data sector preceding the first data sector, wherein the first current comprises a first maximum transition frequency; and applying a second current to the write coil while the head is over the first data sector, wherein the second current comprises a second maximum transition frequency higher than the first maximum transition frequency.

2. The data storage device as recited in claim 1, wherein:
the first current comprises a first amplitude; and
the second current comprises a second amplitude lower than the first amplitude.

3. The data storage device as recited in claim 2, wherein the control circuitry is further configured to execute the write operation by ramping down the first current from the first amplitude to the second amplitude in order to degauss the write coil.

4. The data storage device as recited in claim 2, wherein the energy assisted magnetic media further comprises a plurality of servo sectors that define the data tracks, and the control circuitry is further configured to execute the write operation by applying a substantially zero current to the write coil while the head is over one of the servo sectors.

5. The data storage device as recited in claim 4, wherein the control circuitry is further configured to execute the write operation by ramping down the first current from the first amplitude to the substantially zero current in order to degauss the write coil.

6. The data storage device as recited in claim 2, wherein the control circuitry comprises a preamp circuit comprising write control logic configured to generate the first current having the first maximum transition frequency.

7. The data storage device as recited in claim 2, wherein:
the control circuitry comprises a preamp comprising write control logic and an interface comprising a write/read line, a mode line, a serial input/output (SIO) interface configured to receive a mode control command;
the write control logic configures an operating mode of the mode line in response to the mode control command; and
when configured into a pre-bias operating mode, the write control logic enables the first current based on the mode line when the write/read line is configured into a read mode and the head is over the first data sector.

8. A data storage device comprising:
an energy assisted magnetic media comprising a plurality of data tracks, wherein each data track comprises a plurality of data sectors;
a head actuated over the energy assisted magnetic media, wherein the head comprises a write coil; and
control circuitry configured to execute a write operation to a first data sector by at least:
applying a first current to the write coil while the head is over a second data sector preceding the first data sector, wherein the first current comprises a first amplitude and a first maximum transition frequency; and
applying a second current to the write coil while the head is over the first data sector, wherein the second current comprises a second amplitude lower than the first amplitude, and a second maximum transition frequency higher than the first maximum transition frequency.

9. The data storage device as recited in claim 8, wherein the control circuitry is further configured to execute the write operation by ramping down the first current from the first amplitude to the second amplitude in order to degauss the write coil.

10. The data storage device as recited in claim 8, wherein the energy assisted magnetic media further comprises a plurality of servo sectors that define the data tracks, and the control circuitry is further configured to execute the write operation by applying a substantially zero current to the write coil while the head is over one of the servo sectors.

11. The data storage device as recited in claim 10, wherein the control circuitry is further configured to execute the write operation by ramping down the first current from the first amplitude to the substantially zero current in order to degauss the write coil.

12. The data storage device as recited in claim 8, wherein the control circuitry comprises a preamp circuit comprising write control logic configured to generate the first current having a predetermined transition frequency.

13. The data storage device as recited in claim 8, wherein:
the control circuitry comprises a preamp comprising write control logic and an interface comprising a write/read line, a mode line, a serial input/output (SIO) interface configured to receive a mode control command;
the write control logic configures an operating mode of the mode line in response to the mode control command; and
when configured into a pre-bias operating mode, the write control logic enables the first current based on the mode line when the write/read line is configured into a read mode and the head is over the first data sector.

14. A data storage device comprising:
an energy assisted magnetic media comprising a plurality of data tracks, wherein each data track comprises a plurality of data sectors;
a head actuated over the energy assisted magnetic media, wherein the head comprises a write coil; and
control circuitry configured to execute a write operation to a first data sector by at least:
applying a first current to the write coil while the head is over a second data sector preceding the first data sector, wherein the first current comprises a first amplitude; and
applying a second current to the write coil while the head is over the first data sector, wherein the second current comprises a second amplitude lower than the first amplitude,
wherein:
the control circuitry comprises a preamp comprising write control logic and an interface comprising a write/read line, a mode line, a serial input/output (SIO) interface configured to receive a mode control command, the write control logic configures an operating mode of the mode line in response to the mode control command, and
when configured into a pre-bias operating mode, the write control logic enables the first current based on the mode line when the write/read line is configured into a read mode and the head is over the first data sector.

* * * * *